US012656193B2

(12) United States Patent
Tanaami et al.

(10) Patent No.: US 12,656,193 B2
(45) Date of Patent: Jun. 16, 2026

(54) FORCE SENSOR AND METHOD FOR MANUFACTURING FORCE SENSOR

(71) Applicants: SINTOKOGIO, LTD., Nagoya (JP); TOHOKU UNIVERSITY, Sendai (JP)

(72) Inventors: Yoshikane Tanaami, Nagoya (JP); Miyuki Hayashi, Nagoya (JP); Yoshiaki Kanamori, Sendai (JP); Taiyu Okatani, Sendai (JP)

(73) Assignees: SINTOKOGIO, LTD., Nagoya (JP); TOHOKU UNIVERSITY, Sendai (JP)

( * ) Notice: Subject to any disclaimer, the term of this patent is extended or adjusted under 35 U.S.C. 154(b) by 450 days.

(21) Appl. No.: 18/112,179

(22) Filed: Feb. 21, 2023

(65) Prior Publication Data

US 2023/0266182 A1     Aug. 24, 2023

(30) Foreign Application Priority Data

Feb. 24, 2022    (JP) .................................. 2022-027048

(51) Int. Cl.
*G01L 1/14* (2006.01)
*G01L 5/165* (2020.01)
(52) U.S. Cl.
CPC .............. *G01L 1/146* (2013.01); *G01L 5/165* (2013.01)
(58) Field of Classification Search
CPC . G01L 1/146; G01L 5/165; G01L 1/25; G01L 1/24; G01L 1/26; G01L 11/00; G01L 11/02; C23F 15/00; F16J 15/104
See application file for complete search history.

(56) References Cited

U.S. PATENT DOCUMENTS

| | | | |
|---|---|---|---|
| 2,752,558 A | 6/1956 | Kane | |
| 3,858,097 A | * 12/1974 | Polye | H01G 4/04 361/283.1 |
| 4,426,673 A | * 1/1984 | Bell | G01L 9/0086 361/283.4 |
| 5,005,421 A | * 4/1991 | Hegner | G01L 9/0075 361/283.4 |
| 5,199,303 A | 4/1993 | Benedikt et al. | |
| 5,249,468 A | 10/1993 | Benedikt et al. | |

(Continued)

FOREIGN PATENT DOCUMENTS

| | | | | |
|---|---|---|---|---|
| CN | 1649803 A | * 8/2005 | | E06B 3/66 |
| CN | 111799309 A | * 10/2020 | | H10K 71/00 |

(Continued)

OTHER PUBLICATIONS

U.S. Office Action issued Apr. 7, 2025 in U.S. Appl. No. 18/179,547.

*Primary Examiner* — Octavia Hollington
(74) *Attorney, Agent, or Firm* — Faegre Drinker Biddle & Reath LLP

(57) ABSTRACT

Provided is a force sensor including: a first substrate that is made of a material that transmits electromagnetic waves and includes a metal array arranged in a periodic pattern on its surface; a second substrate that is disposed to face the first substrate with a gap therebetween and includes a metal layer that reflects the electromagnetic waves transmitted through the first substrate on its surface; a connecting member configured to connect the first substrate to the second substrate and define an internal space that houses the metal array and the metal layer; and an inert substance that fills the internal space.

5 Claims, 7 Drawing Sheets

(56) References Cited

U.S. PATENT DOCUMENTS

| | | | | |
|---|---|---|---|---|
| 5,483,994 | A | 1/1996 | Maurer | |
| 5,503,023 | A | 4/1996 | Benedikt et al. | |
| 5,703,282 | A | 12/1997 | Kuesell et al. | |
| 7,698,952 | B2 * | 4/2010 | Renken | G01L 9/0073 |
| | | | | 73/780 |
| 8,839,683 | B2 * | 9/2014 | Sabarinathan | G01L 9/0076 |
| | | | | 73/862.541 |
| 9,201,105 | B2 * | 12/2015 | Iida | G06F 3/0447 |
| 9,534,972 | B2 | 1/2017 | Eichhorn et al. | |
| 9,785,297 | B2 * | 10/2017 | Kawaguchi | G06F 3/0448 |
| 9,825,557 | B2 * | 11/2017 | Wang | H02N 1/04 |
| 10,886,605 | B2 * | 1/2021 | Varel | H01Q 3/44 |
| 2014/0191116 | A1 | 7/2014 | Sano et al. | |
| 2016/0047838 | A1 | 2/2016 | Tanaka | |
| 2016/0349128 | A1 | 12/2016 | Kaufmann et al. | |
| 2020/0158557 | A1 | 5/2020 | Le Floc'h | |
| 2021/0326827 | A1 | 10/2021 | Razaghi et al. | |
| 2023/0204445 | A1 | 6/2023 | Marsh | |
| 2023/0266188 | A1 * | 8/2023 | Tanaami | G01L 1/24 |
| | | | | 73/865.8 |
| 2023/0314247 | A1 * | 10/2023 | Tanaami | G01L 1/24 |
| | | | | 73/862.624 |

FOREIGN PATENT DOCUMENTS

| | | | | | |
|---|---|---|---|---|---|
| DE | | 3137219 | A1 * | 4/1983 | |
| DE | | 41 03 706 | A1 | 1/1992 | |
| JP | | H07-260611 | A | 10/1995 | |
| JP | | 2000294759 | A * | 10/2000 | |
| JP | | 2004311345 | A * | 11/2004 | |
| JP | | 2007-057455 | A | 3/2007 | |
| JP | | 2014-132303 | A | 7/2014 | |
| JP | | 5660122 | B2 * | 1/2015 | G01T 1/2018 |
| JP | | 2016-042041 | A | 3/2016 | |
| JP | | 2019-525182 | A | 9/2019 | |
| JP | | 2020-094973 | A | 6/2020 | |
| WO | WO-2020014356 | A1 * | 1/2020 | | B25J 13/084 |

* cited by examiner

FORCE SENSOR AND METHOD FOR MANUFACTURING FORCE SENSOR

CROSS-REFERENCE TO RELATED APPLICATION

This application is based on Japanese Unexamined Patent Publication No. 2022-027048 filed with Japan Patent Office on Feb. 24, 2022, the entire contents of which are hereby incorporated by reference.

TECHNICAL FIELD

The present disclosure relates to a force sensor and a method for manufacturing a force sensor.

BACKGROUND

Japanese Unexamined Patent Publication No. 2020-94973 discloses a displacement sensor having an air gap structure in which a gap between a metal array and a metal layer can be changed by an external force, and a method for manufacturing the displacement sensor. The gap is an air layer provided between the metal array and the metal layer.

SUMMARY

In the displacement sensor of Japanese Unexamined Patent Publication No. 2020-94973, the metal array or metal layer is exposed to the air layer. For this reason, the metal array or metal layer may oxidize and characteristics of the force sensor may deteriorate. The present disclosure provides a technique for inhibiting oxidation of the metal array and the metal layer.

A force sensor according to one aspect of the present disclosure includes a first substrate, a second substrate, a connecting member, and an inert substance. The first substrate is made of a material that transmits electromagnetic waves. The first substrate has a metal array arranged in a periodic pattern on its surface. The second substrate is disposed to face the first substrate with a gap therebetween. The second substrate has a metal layer that reflects the electromagnetic waves transmitted through the first substrate on its surface. The connecting member connects the first substrate to the second substrate and defines an internal space that houses the metal array and the metal layer. The internal space is filled with the inert substance.

In the force sensor, the internal space in which the metal array and the metal layer are housed is defined. The internal space is filled with the inert substance. Thus, in the force sensor, the metal array and the metal layer can be prevented from being exposed to the air containing oxygen. Accordingly, in the force sensor, oxidation of the metal array and the metal layer can be inhibited.

According to one embodiment, the force sensor may include a sealing member. The connecting member may have an opening that communicates the internal space with the outside. The sealing member may seal the opening. In this case, in the force sensor, the internal space can be filled with the inert substance through the opening, and the inert substance can be sealed in the internal space by the sealing member.

According to one embodiment, a spacer member that is disposed in the internal space and regulates a height of the internal space may be provided. The height of the internal space is a gap between the first substrate and the second substrate. In the force sensor, a positional relationship between the first substrate and the second substrate can be maintained to make the gap between the first substrate and the second substrate constant in an unloaded state.

The inert substance may be an inert gas or silicone oil.

A method for manufacturing a force sensor according to another aspect of the present disclosure includes the following (1) to (3). (1) Preparing a first substrate, a second substrate, and a connecting member. The first substrate is made of a material that transmits electromagnetic waves. The first substrate has a metal array arranged in a periodic pattern on its surface. The second substrate is disposed to face the first substrate with a gap therebetween. The second substrate has a metal layer that reflects the electromagnetic waves transmitted through the first substrate on its surface. The connecting member connects the first substrate to the second substrate. The connecting member defines an internal space that houses the metal array and has an opening that communicates the internal space with the outside.

(2) Decompressing the internal space from the opening.

(3) Filling the decompressed internal space with an inert substance through the opening.

(4) Sealing the opening with a sealing member.

In the manufacturing method, the internal space is filled with the inert substance through the opening and the internal space is sealed by the sealing member. Thus, according to the manufacturing method, the metal array and the metal layer can be prevented from being exposed to the air containing oxygen. Therefore, according to the manufacturing method, the force sensor in which oxidation of the metal array and the metal layer can be inhibited can be provided.

According to the present disclosure, oxidation of the metal array and the metal layer can be inhibited.

DETAILED DESCRIPTION

Figure 1:
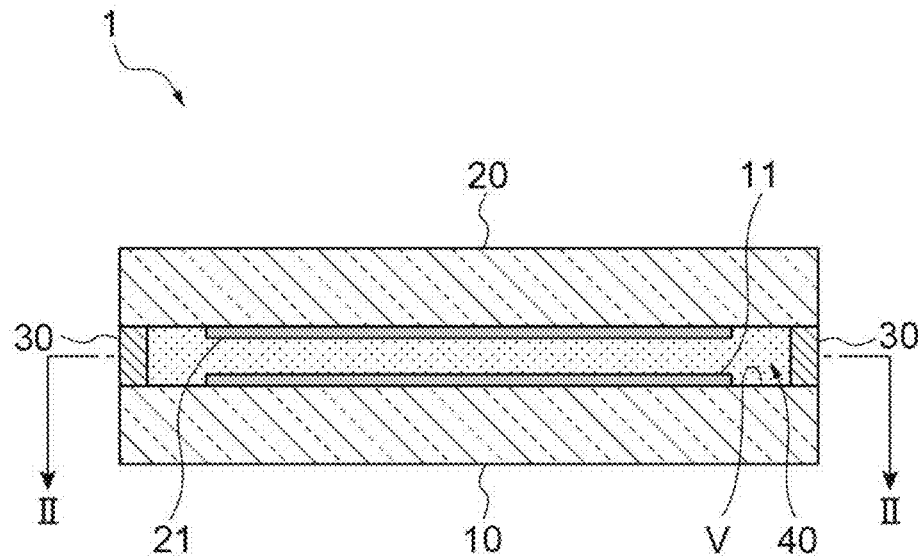
FIG. 1 is a cross-sectional view showing an example of a force sensor according to one embodiment.

Embodiments of the present disclosure will be described below with reference to the drawings. Also, in the following description, the same or corresponding elements will be denoted by the same reference numerals, and repetitive description will not be repeated. Dimensional ratios in the drawings do not necessarily match those in the description.

[Force sensor] A force sensor manufactured by a manufacturing method according to the present embodiment is a force sensor using electromagnetic waves. Electromagnetic waves include visible light, infrared light, terahertz waves, or microwaves. The force sensor has an air gap structure in which a gap is formed between a metal array and a metal layer. Reflected waves are measured from incident waves of electromagnetic waves incident into the air gap structure. A resonant wavelength is obtained on the basis of the incident and reflected waves. The resonant wavelength changes with a size of the gap formed between the metal array and the metal layer. The gap formed between the metal array and the metal layer changes due to an external force. That is, the force sensor using electromagnetic waves is a sensor for measuring the external force on the basis of a change in the resonant wavelength.

Figure 2:
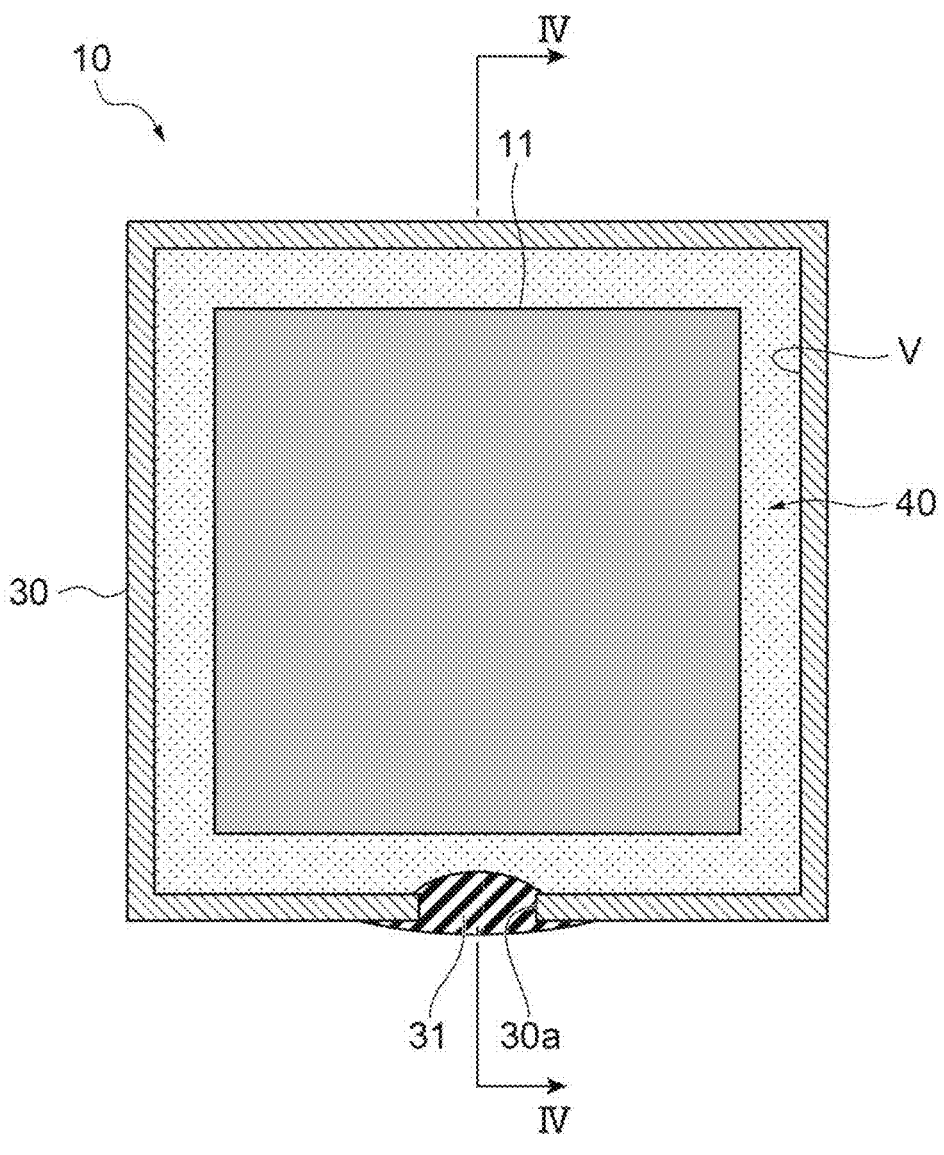
FIG. 2 is a cross-sectional view along line II-II in FIG. 1.

FIG. 1 is a cross-sectional view showing an example of a force sensor according to one embodiment. FIG. 2 is a cross-sectional view along line II-II in FIG. 1. As shown in FIG. 1, a force sensor 1 includes a lower substrate 10 and an upper substrate 20. The lower substrate 10 is made of a material that transmits light. The lower substrate 10 is an example of a first substrate. The upper substrate 20 is an example of a second substrate. Light is an example of electromagnetic waves. The lower substrate 10 is, for example, a glass substrate. The lower substrate 10 has a metal array 11 arranged in a periodic pattern on its upper surface. The upper surface is an example of a surface of the lower substrate 10. The metal array 11 is, for example, a rod array or dot array. The metal array 11 may be configured by a pattern in which substantially square arrays, of which a side is 350 nm, are periodically arranged at intervals of 400 nm. A material of the metal array 11 is, for example, Au (gold) or Al (aluminum). The upper substrate 20 does not have to be made of a material that transmits light and may be a glass substrate, a silicon substrate, or the like. The upper substrate 20 has a metal layer 21 that reflects light on its lower surface. The lower surface is an example of a surface of the upper substrate 20. A material of the metal layer 21 is Au or Al, for example. The lower substrate 10 and the upper substrate 20 may be made of alkali-free glass or quartz containing no alkali component.

The force sensor 1 has a connecting member 30. As shown in FIGS. 1 and 2, the lower substrate 10 and the upper substrate 20 are connected to each other by the connecting member 30. The connecting member 30 is provided around the metal array 11 and the metal layer 21. The connecting member 30 fixes the lower substrate 10 and the upper substrate 20 with a gap therebetween. The upper substrate 20 is disposed to face the lower substrate 10 with the gap therebetween. Thus, the connecting member 30 defines an internal space V including the metal array 11 and the metal layer 21 between the lower substrate 10 and the upper substrate 20. The connecting member 30 is made of a metal that is less likely to oxidize and has a high melting point. The connecting member 30 may be configured of a fused metal layer. As an example, the connecting member 30 is configured of a metal layer in which a first metal layer formed on the lower substrate 10 and a second metal layer formed on the second substrate are fused together. Each of the first metal layer and the second metal has, for example, a three-layer structure of Mo (molybdenum)/Al/Mo. Each of the first metal layer and the second metal may be configured of a single layer of Al, Mo, Ag (silver), Ti (titanium), or Cr (chromium).

The force sensor 1 includes an inert substance 40 that fills the internal space V. The inert substance 40 is a fluid with low chemical activity. The inert substance 40 is, for example, an inert gas. The inert gas is, for example, nitrogen gas, carbon dioxide, or a noble gas. As shown in FIG. 2, the connecting member 30 has a sealing member 31 and an opening 30*a* that communicates the internal space V with the outside. The opening 30*a* is formed by cutting out a portion of the connecting member 30 around the metal array 11 and the metal layer 21. The opening 30*a* is sealed with the sealing member 31. That is, the inert substance 40 is sealed in the internal space V by the sealing member 31. The sealing member 31 is, for example, an ultraviolet curable resin.

Some light transmitted through the lower substrate 10 and the metal array 11 is reflected by the metal layer 21 and absorbed by resonating between the metal array 11 and the metal layer 21. A wavelength of the absorbed light is changed by the gap between the metal array 11 and the metal layer 21. The force sensor 1 is configured such that a posture of the upper substrate 20 relative to the lower substrate 10 is changed in accordance with a load from the outside. Accordingly, the load applied to the force sensor 1 is indicated by a change in wavelength of the light absorbed by force sensor 1.

Figure 3:
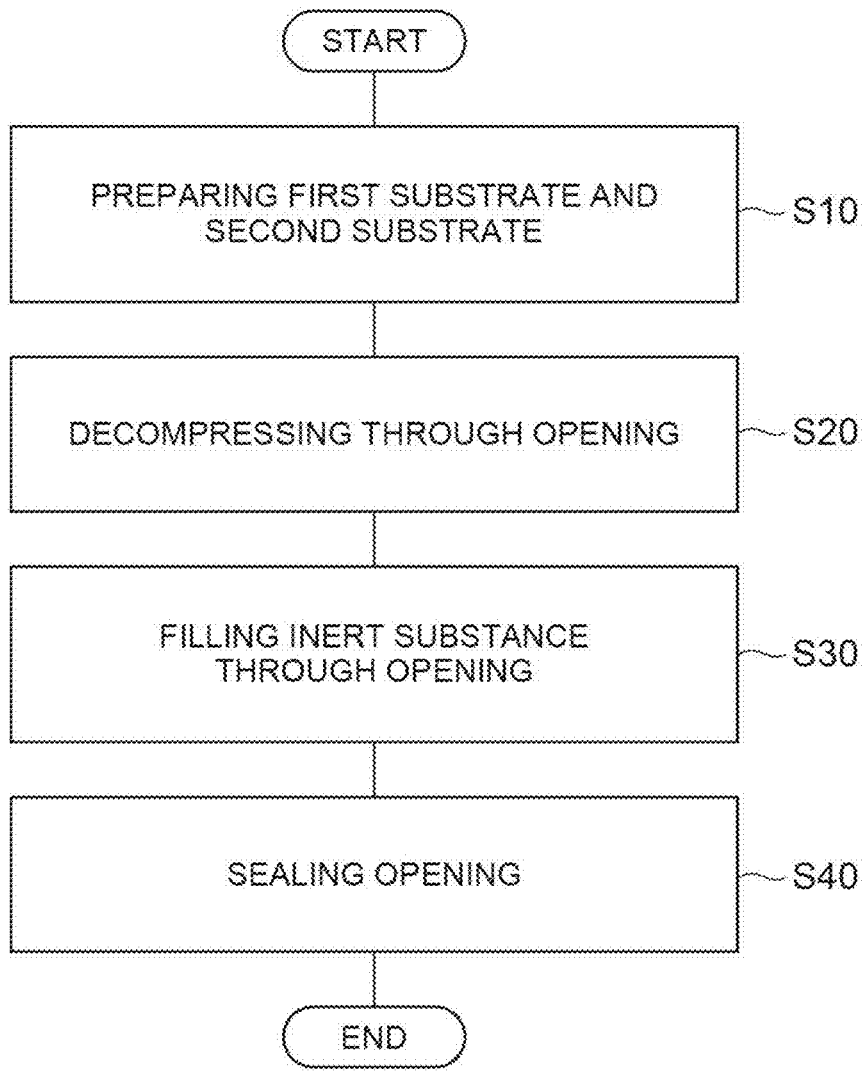
FIG. 3 is a flow chart showing an example of a manufacturing method according to one embodiment.

[Method for manufacturing force sensor] FIG. 3 is a flowchart showing an example of a manufacturing method M1 of the force sensor 1 according to the present embodiment. In the manufacturing method M1, first, the lower substrate 10, the upper substrate 20, and the connecting member 30 are prepared (S10). As described above, the lower substrate 10 is made of a material that transmits electromagnetic waves. The lower substrate 10 has the metal array 11 arranged in a periodic pattern on its surface. The upper substrate 20 is disposed to face the lower substrate 10 with the gap therebetween. The upper substrate 20 has the metal layer 21 that reflects electromagnetic waves on its surface. The connecting member 30 connects the lower substrate 10 to the upper substrate 20. The connecting member 30 defines the internal space V and has the opening 30*a* that communicates the internal space V with the outside. In this way, in S10, the force sensor 1 in which the lower substrate 10 and the upper substrate 20 are connected to each other by the connecting member 30 is prepared.

Figure 4:
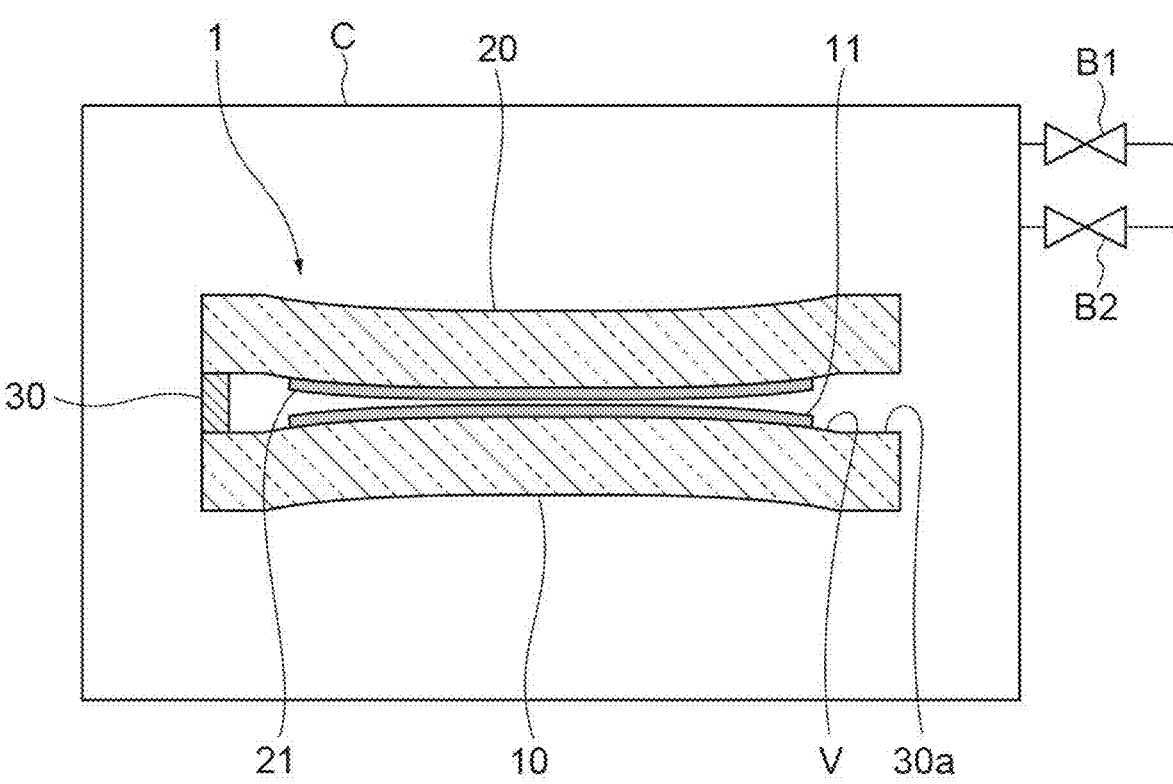
FIG. 4 is a diagram for explaining a decompressing of the manufacturing method according to one embodiment.

Next, the internal space V of the force sensor 1 is decompressed (S20). FIG. 4 is a diagram for explaining a decompressing of the manufacturing method according to one embodiment. FIG. 4 shows a cross-sectional view of the force sensor 1 along line IV-IV in FIG. 2 in the decompressing. As shown in FIG. 4, the force sensor 1 is housed inside a container C that can be evacuated into a vacuum state. The container C includes a valve B1 connected to a vacuum pump (not shown) for evacuating the inside of the container C, and a valve B2 connected to a gas source (not shown) for introducing the inert substance 40 into the container C. In the present embodiment, the inert substance 40 is an inert gas. The inside of the container C is decompressed by opening the valve B1 and operating the vacuum pump. The force sensor 1 in which the internal space V is decompressed deforms such that the lower substrate 10 and the upper substrate 20 come closer to each other.

Figure 5:
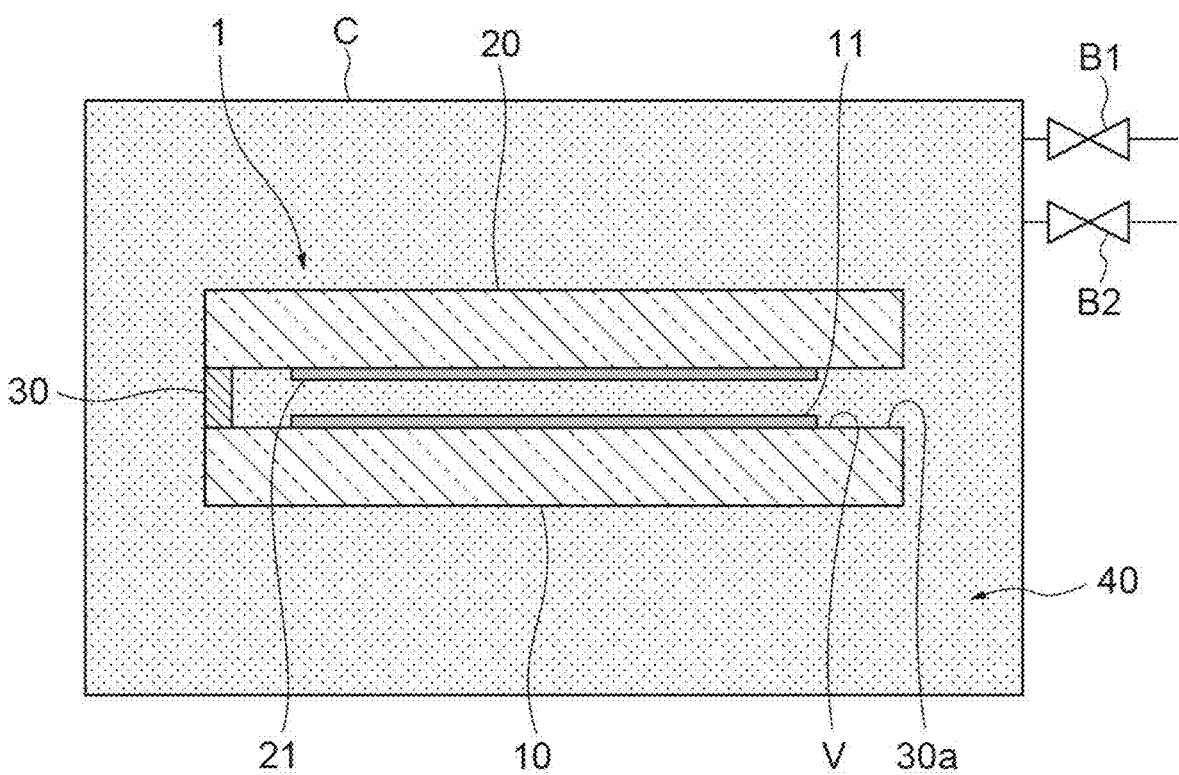
FIG. 5 is a diagram for explaining a filling of the manufacturing method according to one embodiment.

Next, the decompressed internal space V of the force sensor 1 is filled with the inert substance 40 (S30). FIG. 5 is a diagram for explaining a filling of the manufacturing method according to one embodiment. By closing the valve B1 and opening the valve B2, as shown in FIG. 5, the inert substance 40 is introduced from the valve B2 into the decompressed container C. The internal space V is filled with the inert substance 40 through the opening 30*a*. By filling the internal space V with the inert substance 40, the decompression of the internal space V is released, and thus deformation of the lower substrate 10 and the upper substrate 20 is eliminated.

Finally, the opening 30*a* of the force sensor 1 is sealed (S40). The sealing member 31 made of an ultraviolet curable resin is applied to the opening 30*a* of the force sensor 1. Then, the sealing member 31 applied to the opening 30*a* is irradiated with ultraviolet rays, and the sealing member 31 is cured, thereby sealing the opening 30a. Through the steps described above, the force sensor 1 is manufactured. Also, the manufacturing method M1 may include a cleaning the metal array 11 before the S40.

[Summary of embodiment] The force sensor 1 defines the internal space V in which the metal array 11 and the metal layer 21 are housed. The internal space V is filled with the inert substance 40. Thus, in the force sensor 1, the metal array 11 and the metal layer 21 can be prevented from being exposed to the air containing oxygen. Accordingly, in the force sensor 1, oxidation of the metal array 11 and the metal layer 21 can be inhibited.

The connecting member 30 has the opening 30a that communicates the internal space V with the outside, and thus, in the force sensor 1, the internal space V can be filled with the inert substance 40 through the opening 30a and the inert substance 40 can be sealed in the internal space V by the sealing member 31.

In the manufacturing method M1 of the force sensor 1, the internal space V is filled with the inert substance 40 through the opening 30a and sealed in the internal space V by the sealing member 31. Thus, according to the manufacturing method M1, the metal array 11 and the metal layer 21 can be prevented from being exposed to the air containing oxygen. Thus, according to the manufacturing method M1, can provide the force sensor 1 in which oxidation of the metal array 11 and the metal layer 21 is inhibited can be provided.

Although various exemplary embodiments have been described above, the present disclosure is not limited to the above embodiments, and various omissions, substitutions, and modifications may be made.

Figure 6:
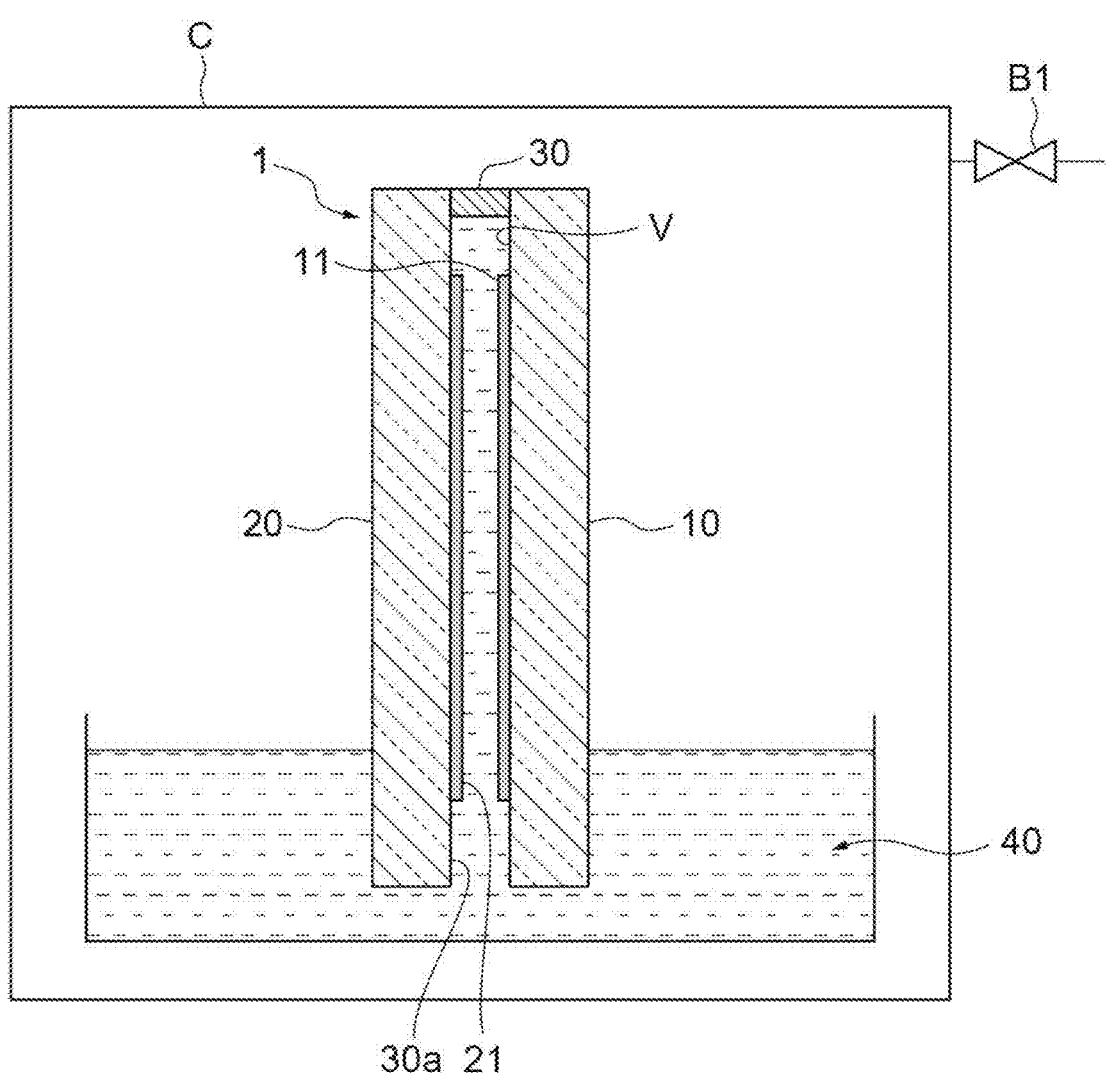
FIG. 6 is a diagram for explaining a filling of a manufacturing method according to a modified example.

[Modified examples] The inert substance 40 may be silicone oil. In this case, in S30, the decompressed internal space V of the force sensor 1 is filled with silicone oil. FIG. 6 is a diagram explaining a filling of a manufacturing method according to a modified example. In FIG. 6, the internal space V is filled with silicone oil through the opening 30a. First, the force sensor 1 is disposed such that the opening 30a is immersed in the silicone oil in a state in which the internal space V of the container C is decompressed. Next, the valve B1 is opened in a state in which the opening 30a is immersed in the silicone oil. Thus, the decompression of the container C is released, and the internal space V of the force sensor 1 is filled with the silicone oil.

The inert substance 40 may be cured after the internal space V has been filled. That is, the inert substance 40 may be solid. As an example, the inert substance 40 may be polydimethylsiloxane (PDMS).

The connecting member 30 may not have the opening 30a. In this case, the connecting member 30 is divided into a first connecting member provided on the lower substrate 10 and a second connecting member provided on the upper substrate 20. The first connecting member and the second connecting member may be connected to each other by fusion or the like in an inert gas atmosphere.

Figure 7:
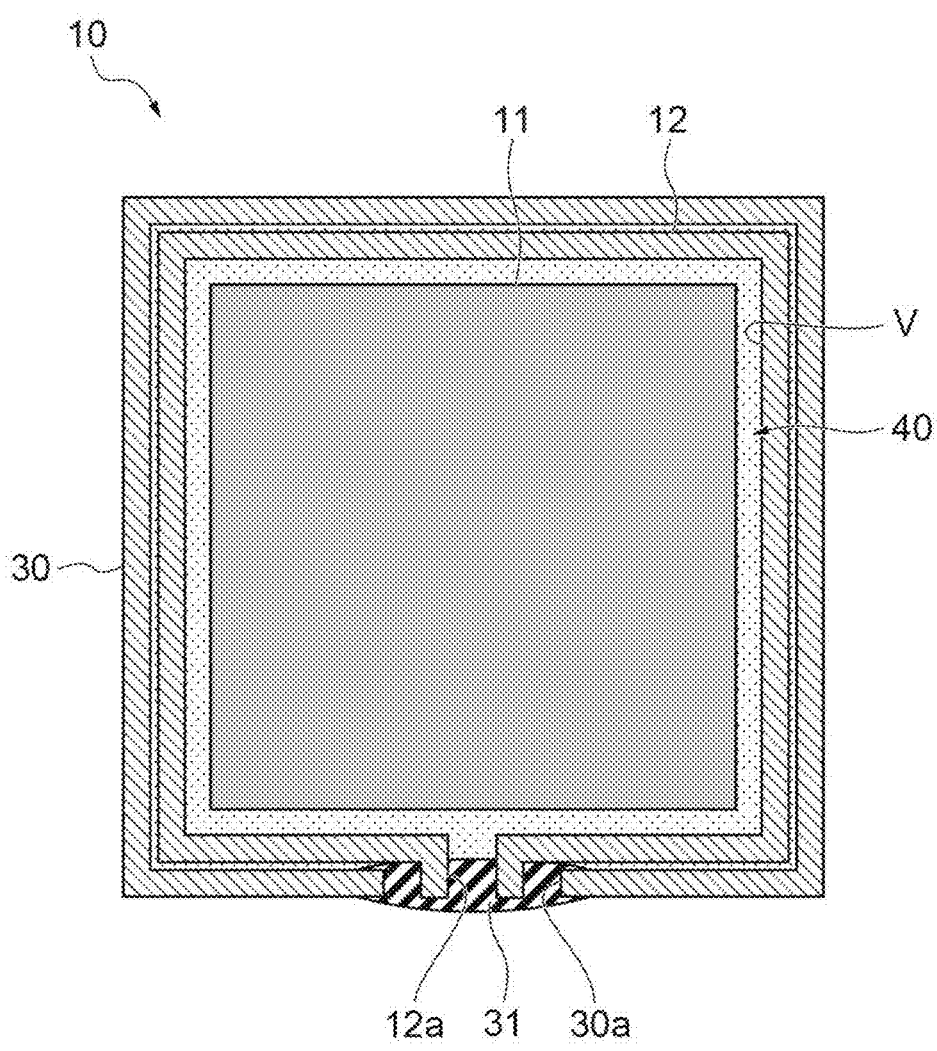
FIG. 7 is a cross-sectional view showing a modified example of a force sensor shown in FIG. 2.

FIG. 7 is a cross-sectional view showing a modified example of the force sensor shown in FIG. 2. In a case in which the connecting member 30 is divided into the first connecting member and the second connecting member, the first connecting member provided on the lower substrate 10 and the second connecting member provided on the upper substrate 20 are fused together, and thus the lower substrate 10 and the upper substrate 20 are connected to each other. In this case, since a height of the connecting member 30 varies due to the fusion, as a result, a height of the internal space V may deviate from a set value. For this reason, the force sensor 1 may include a spacer member 12. The spacer member 12 is provided on the lower substrate 10 inward from the connecting member 30 in the internal space V to surround the metal array 11. The spacer member 12 may be provided on the upper substrate 20 or may be provided by being divided into a first spacer member for the lower substrate 10 and a second spacer member for the upper substrate 20. The spacer member 12 regulates the height of the internal space V when the first connecting member and the second connecting member are fused together. The height of the internal space V is a distance between the lower substrate 10 and the upper substrate 20. The spacer member 12 has an opening 12a that communicates with the opening 30a of the connecting member 30. The internal space V is filled with the inert substance 40 through the openings 30a and 12a. The sealing member 31 seals the opening 30a and the opening 12a. Other configurations of the force sensor according to the modified example are the same as those of the force sensor 1 shown in FIG. 2. In the force sensor 1, by providing the spacer member 12, a positional relationship between the lower substrate 10 and the upper substrate 20 can be maintained to make the gap between the lower substrate 10 and the upper substrate 20 constant in an unloaded state.

The force sensor 1 may include a protective layer that covers the surface of the metal array 11. By providing the protective layer, the above-described cleaning can be omitted in a manufacturing process of the force sensor 1. The protective layer is made of quartz, for example. The protective layer protects the metal array 11 from damage, oxidation, or the like.

The thickness of the spacer member 12 may be 190 nm. The thickness of the metal layer 21 may be 100 nm. The thickness of the metal array 11 may be 30 nm. A thickness of the protective layer may be 35 nm. A gap between the metal layer 21 and the protective layer may be 30 nm. A distance between metal layer 21 and metal array 11 may be 65 nm.

REFERENCE SIGNS LIST

1 Force sensor
10 Lower substrate (example of first substrate)
11 Metal array
12 Spacer member
20 Upper substrate (example of second substrate)
21 Metal layer
30 Connecting member
30a Opening
31 Sealing member
40 Inert substance

What is claimed is:

1. A force sensor comprising:
   a first substrate that is made of a material that transmits electromagnetic waves and includes a metal array arranged in a periodic pattern on a surface of the first substrate;
   a second substrate that is disposed to face the first substrate with a gap therebetween and includes a metal layer that reflects the electromagnetic waves transmitted through the first substrate on a surface of the second substrate;
   a connecting member configured to connect the first substrate to the second substrate and define an internal space that houses the metal array and the metal layer;
   an inert substance filling the internal space; and a sealing member,
wherein the force sensor is configured such that a posture of the first substrate relative to the second substrate is changed in accordance with a load from an outside, and
wherein the connecting member includes an opening that communicates the internal space with the outside, and the sealing member seals the opening.

2. The force sensor according to claim 1 further comprising a spacer member that is disposed in the internal space and regulates a height of the internal space.

3. The force sensor according to claim 2, wherein the inert substance is an inert gas or silicone oil.

4. The force sensor according to claim 1, wherein the inert substance is an inert gas or silicone oil.

5. A method for manufacturing a force sensor comprising:
preparing a first substrate that is made of a material that transmits electromagnetic waves and includes a metal array arranged in a periodic pattern on a surface of the first substrate, a second substrate that is disposed to face the first substrate with a gap therebetween and includes a metal layer that reflects the electromagnetic waves transmitted through the first substrate on a surface of the second substrate, and a connecting member configured to connect the first substrate to the second substrate, define an internal space that houses the metal array, and include an opening that communicates the internal space with an outside;
decompressing the internal space from the opening;
filling the decompressed internal space with an inert substance through the opening; and
sealing the opening with a sealing member,
wherein the force sensor is configured such that a posture of the first substrate relative to the second substrate is changed in accordance with a load from the outside.

* * * * *